(No Model.) 3 Sheets—Sheet 2.

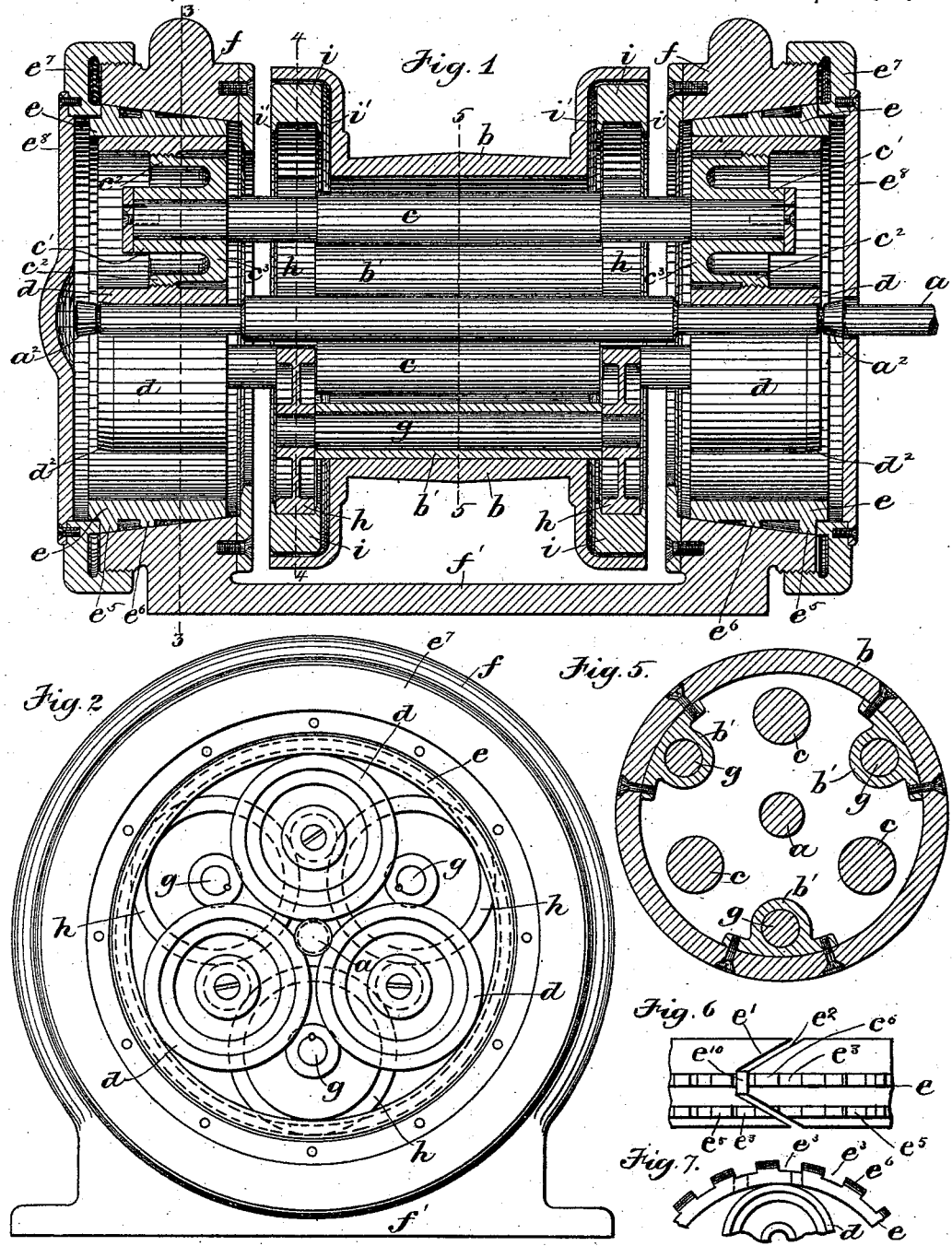

G. J. ALTHAM.
POWER TRANSMITTING APPARATUS.

No. 526,887. Patented Oct. 2, 1894.

WITNESSES:
A. D. Harrison.
Rollin Abell.

INVENTOR
Geo. J. Altham
BY Knight Brown Crossley
ATTORNEYS.

(No Model.) 3 Sheets—Sheet 3.
G. J. ALTHAM.
POWER TRANSMITTING APPARATUS.
No. 526,887. Patented Oct. 2, 1894.
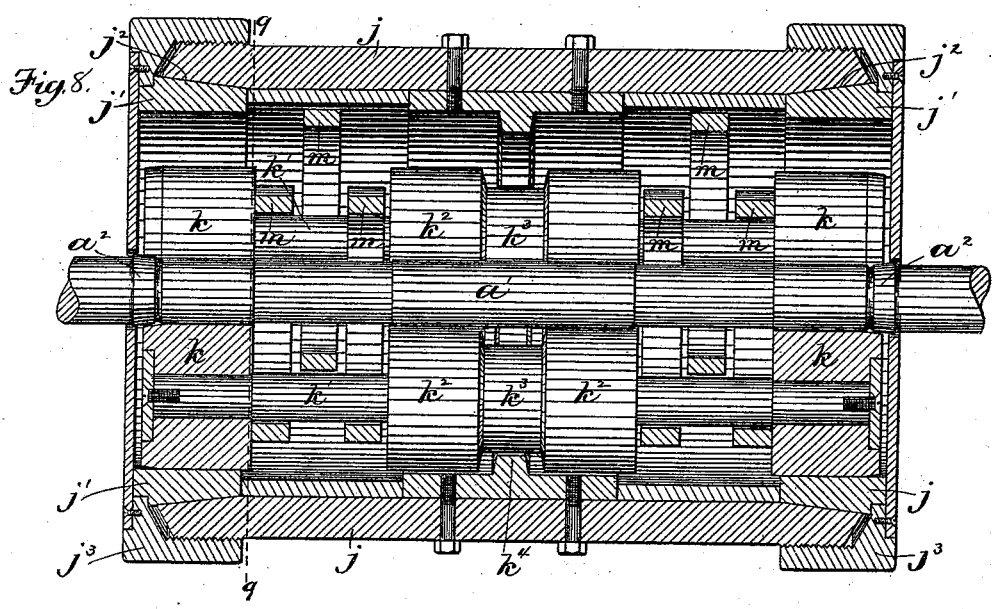
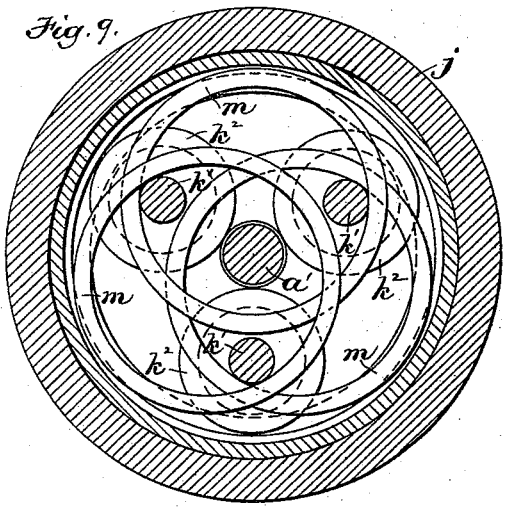
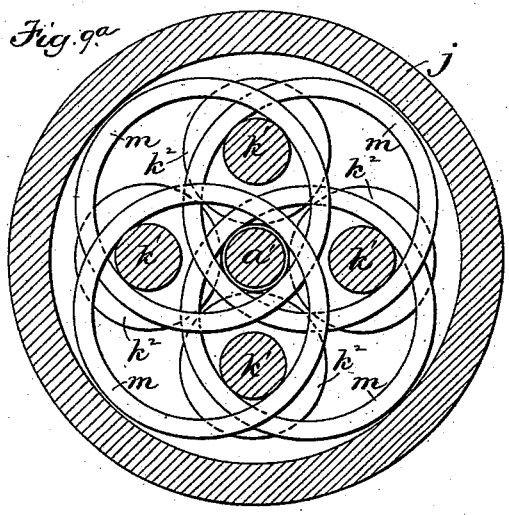
WITNESSES:
INVENTOR
ATTORNEYS.

UNITED STATES PATENT OFFICE.

GEORGE J. ALTHAM, OF SWANSEA, MASSACHUSETTS.

POWER-TRANSMITTING APPARATUS.

SPECIFICATION forming part of Letters Patent No. 526,887, dated October 2, 1894.

Application filed May 1, 1894. Serial No. 509,624. (No model.)

*To all whom it may concern:*

Be it known that I, GEORGE J. ALTHAM, of Swansea, in the county of Bristol and State of Massachusetts, have invented certain new and useful Improvements in Power-Transmitting Apparatus, of which the following is a specification.

This invention has for its object to provide means whereby power may be transmitted from a driving member to a driven member with the minimum resistance caused by friction, and without the necessity of lubrication; so that power can be transmitted to or from a shaft, the latter running at a high rate of speed without danger of heating and without lubrication.

The invention may be adapted either to the transmission of power from a shaft to a pulley or other member surrounding the shaft, or from a rotary casing or member driven by external power to a shaft, the shaft being in each case connected with the member which either receives power from it or transmits power to it, by anti-friction mechanism embodying my improvement.

I attain the objects of my invention by the mechanism and devices hereinafter described and claimed.

Figure 10:
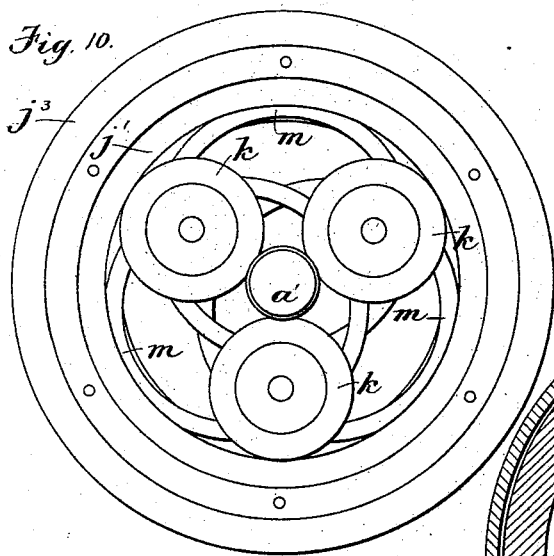
Figure 4:
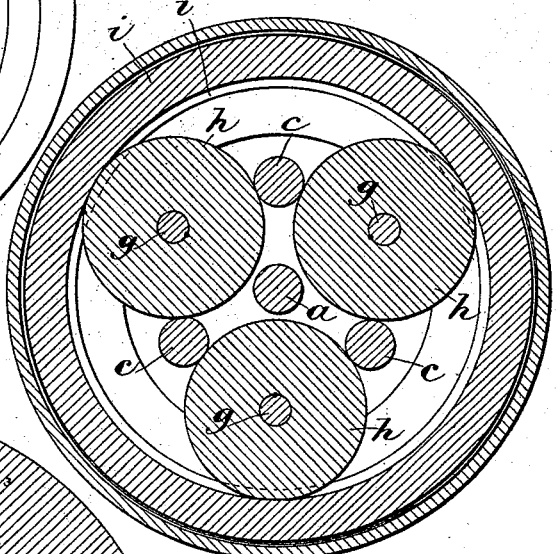
Figure 3:
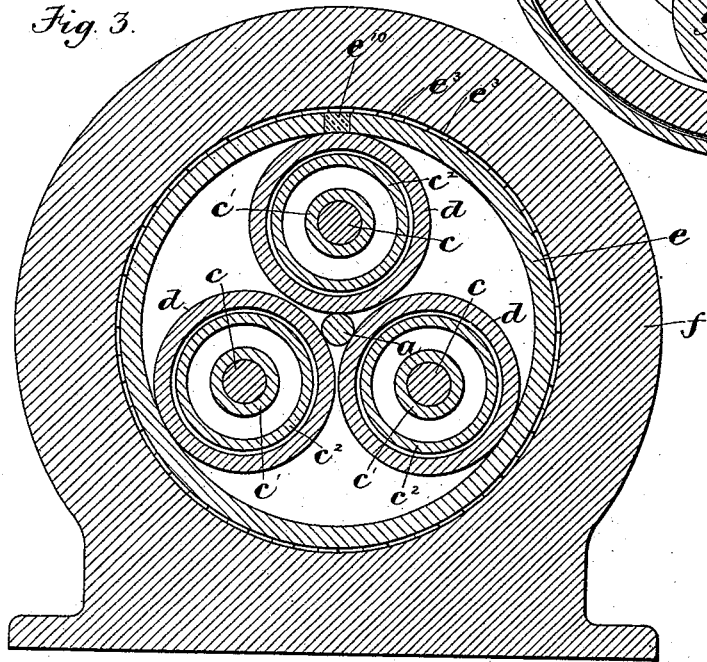

Of the accompanying drawings, forming part of this specification, Figure 1 represents a longitudinal section showing the preferred embodiment of my invention, when the central shaft is driven and transmits motion to a pulley surrounding the shaft and connected therewith through the medium of improved anti-friction devices forming a part of my invention. Fig. 2 represents an end view of the construction shown in Fig. 1, the cap shown at the left-hand end of Fig. 1 being removed to show the internal construction. Fig. 3 represents a section on line 3—3 of Fig 1. Fig. 4 represents a section on line 4—4 of Fig. 1. Fig. 5 represents a section on line 5—5 of Fig. 1. Fig. 6 represents a top view of one of the annular compressible bearings hereinafter referred to. Fig. 7 represents an edge view of the portion of said bearing shown in Fig. 6. Fig. 8 represents a longitudinal section, showing the preferred construction when the central shaft is driven by power transmitted to it from the surrounding casing through the anti-friction devices. Fig. 9 represents a section on line 9—9 of Fig. 8, looking toward the right. Fig. 9$^a$ represents a section similar to Fig. 9, showing a modification. Fig. 10 represents an end view of the construction shown in Fig. 8, the end cap being removed.

The same letters of reference indicate the same parts in all the figures.

Figs. 1 to 5, inclusive, show the preferred construction of my improved bearing when employed to transmit motion from the central power-driven shaft at a reduced rate. Referring to said figures, $a$ represents a shaft, which may be driven by any suitable motor, such as the turbine shown in Letters Patent of the United States granted to me May 31, 1892, No. 475,957. $b$ is a hollow pulley, which surrounds and receives motion from said shaft through the anti-friction devices hereinafter described. $c\ c\ c$ represent shafts which extend through the pulley and are parallel with the shaft $a$. To the ends of the shafts $c$ are affixed rolls $d$ which are in rolling contact with the shaft $a$ and with the inner surfaces of fixed annular bearings $e\ e$ attached to fixed housings or containers $f\ f$. $g\ g$ represent shafts which are journaled in bearings $b'\ b'$ affixed to the inner surface of the pulley $b$, said shafts being also parallel with the shaft $a$. To the ends of the shafts $g$ are affixed rolls $h$ which are in rolling contact with the shafts $c\ c$ and with the inner surfaces of loose rings $i\ i$ which have inwardly projecting lips or flanges $i'$ engaging them with said rolls, said flanges preventing independent lateral movement of the rings and rolls.

It will be seen that the rolls $d$ supported by the fixed bearings $e$ constitute rolling supports for the shaft $a$, and are given a planetary motion about said shaft by the rotation thereof, the shafts $c$ being connected with said rolls, so that they receive the same motion.

The pulley $b$ receives a rotary motion from the shafts $c$ through the rolls $h$, which are in rolling contact with said shafts, and the shafts $g$ attached to said rolls and engaged with the pulley by the bearings $b'$ attached to the pulley, said rolls $h$ and shafts $g$ receiving a planetary motion from the shafts $c$. A reduced motion is thus imparted to the pulley from the shaft, with so little frictional resistance that no lubrication is necessary, however high the speed of the shaft may be.

The bearing-rings $e$ $e$ are made contractible, so that they can be adjusted inwardly or contracted from time to time, to compensate for wear of the surfaces of the ring, of the rolls $d$, and of the shaft, to the end that a close contact may be maintained between said surfaces, and slipping or lost motion thereof prevented. Each ring $e$ is cut across at a suitable point in its periphery to form two ends $e'$ $e^2$ (Fig. 6), one of said ends being recessed and the other projecting into the recess, so that while the ends are separated by a space, permitting them to approach each other for the purpose of contracting the ring, there is practically no break in the continuity of the bearing surface. The containers $f$ $f$ are provided with tapering inner surfaces, and the outer surfaces of the rings $e$ $e$ are correspondingly formed, so that lateral pressure exerted on the rings to force them into the containers will cause the contraction of the rings. I prefer to give the rings the described external taper by providing them with ribs $e^5$ $e^6$ of different height, said ribs bearing on the tapered surfaces of the containers, as shown in Fig. 1. The ribs are provided with transverse grooves $e^3$ which increase their flexibility and permit the ready contraction or bending of the rings. This construction makes the rings more flexible and more easily contracted than they would be if they were gradually tapered from one edge to the other. A block $e^{10}$ of soft compressible metal is placed between the ends of each ring $e$ to preserve the continuity of the rings and prevent any tendency of the ends of the rings to become approximately straight.

$e^7$ $e^7$ represent pressure rings which are internally screw-threaded to engage external threads on the containers $f$, and are formed to bear on the outer edges of the bearing rings $e$. When said pressure rings are rotated, to give them an inward movement, they force the bearing rings into the containers, and thus cause the contraction of said bearing rings.

$e^8$ $e^8$ represent caps or plates which are attached to the rings $e^7$ for the purpose of covering the outer ends of the cavities or chambers containing the rolls $d$.

The rolls $d$ are connected with shafts $c$ by flexible connections which permit the rolls to adjust themselves to the portions of the bearing rings $e$ and shaft $a$ on which they bear, so that good frictional contact will not be impaired by slight variations in the diameters of either the bearing rings, rolls, or shaft. I have here shown as such elastic connection sleeves $c'$ mounted to rotate freely on the end portions of the shafts $c$, and comparatively thin flexible annular flanges $c^2$ connected to the sleeve $c'$ by webs $c^3$, said flanges being externally screw-threaded at their outer ends and engaged with internal threads formed in the rolls $d$, said threads being at central portions of the rolls, so that the rolls are in contact with the flanges $c^2$ only at their central portions, as clearly shown in Fig. 1. This construction enables the rolls $d$ to adjust themselves to the corresponding surfaces of the bearing rings and shaft, and compensates for any slight variations in the diameters of said surfaces, as will be readily seen.

In order to reduce to the minimum the wear occasioned by the frictional contact of the rolls $d$ with the shaft and with the bearing rings $e$, I provide for the independent endwise movement of said rolls and their shafts, so that the wear may be distributed over a greater length of the shaft than would be the case if the rolls had no endwise movement. I find that when the rolls are permitted to move endwise, they have a constant tendency to so move, and that by giving them an initial movement in one direction they will continue to move in that direction until the movement is arrested and reversed. I have therefore provided means for arresting the movement of the rolls $d$ after they have moved a limited distance in one direction, and imparting movement in the reverse direction to the rolls, this operation being continued, so that the rolls are constantly moving endwise with a slow reciprocating motion. This result is conveniently attained by providing the shaft $a$ with two tapered or frusto-conical sections $a^2$ $a^2$, the taper of one being the reverse of that of the other, as shown in Fig. 1, and forming upon the outer end of each roll $d$ a tapered section $d^2$ which corresponds to the taper of the adjacent section $a^2$, the arrangement being such that when the movement of the rolls in one direction along the shaft brings the tapered sections of the rolls at one end of the apparatus into contact with the tapered section $a^2$ at the same end, the endwise movement will be stopped, and the rolls $d$ and their shafts $c$ will be given a slight lateral movement, which gives said shafts and rolls a slight angle relatively to the shaft $a$. In other words, the shafts $c$ and the rolls thereon become slightly askew, so that they have a tendency to move endwise in the opposite direction, this movement continuing until the rolls $d$ at the other end meet the other tapered section $a^2$, when the rolls and their shafts are thrown over at a different angle, causing their endwise movement to be again reversed The described devices constitute automatic means for reciprocating the rolls endwise. It will be seen, therefore, that the rolls instead of wearing a track the width of which is equal only to their own length, cover an extent of the surface on the shaft $a$ which is considerably longer than their own length.

In Figs. 8, 9, and 10, I show the preferred construction when motion is to be imparted to the central shaft at an increased rate, from a member rotating about said shaft. In said figures, $a'$ represents the shaft to which motion is to be imparted. $j$ represents a cylindrical casing surrounding the shaft and adapted to be rotated by power externally applied in any suitable way. $j'\ j'$ represent rings affixed to the ends of the casing $j$, the inner surfaces of said rings constituting annular bearings, which are constructed to be contracted like the bearing rings $e\ e$. $k\ k$ represent rolls in contact at their outer portions with the bearings $j'$ and at their inner portions with the shaft $a'$. Said rolls are attached to shafts $k'$ which extend parallel with the shaft $a'$. $k^2\ k^2$ represent rolls which are also affixed to the shafts $k'$ and bear on the central portion of the shaft $a'$. Said rolls $k^2$ have peripheral grooves $k^3$, into which projects an annular rib $k^4$ affixed to the casing $j$, the office of said rib being to prevent extreme endwise displacement of the rolls $k$ and $k^2$. It will be seen that rotary motion imparted to the casing $j$ will be transmitted, highly multiplied, to the shaft $a'$ through the rolls $k\ k^2$.

The casing $j$ is provided with inclined seats $j^2$, which bear upon inclined outer sides of the rings $j'$ and cause the contraction of said rings when the latter are forced inwardly by the pressure rings $j^3$, which operate in the same manner as the ring $e^7$ above described, so that provision is made for contracting the rings $j$ to compensate for wear of the surfaces of the rings, the rolls $k$, and the shaft $a'$. The shaft is provided with the frusto-conical sections $a^2\ a^2$ which co-operate with the correspondingly formed outer ends of the rolls $k$ in imparting initial endwise movement to said rolls and to the rolls $k^2$.

$m\ m\ m$ represent rings which are interlocked with the shafts $k'$ in such manner as to hold said shafts in their proper relative positions between the central shaft $a'$ and the casing. Each ring incloses two shafts, as shown in Fig. 9, and the rings are so arranged that each shaft $k'$ is confined between the sides of an elliptical shaped recess composed of portions of the inner surfaces of two rings, one side of the recess being a part of one ring and the other side a part of another ring. The rings are held in place by the shafts $k'$, the inner surface of each ring being in contact with two shafts, which bear on diametrically opposite points on the ring. Hence the rings are held in place by the shafts, while the shafts are kept at the proper distances apart by the rings. The rings are free to rotate, and are, in fact, rotated by their frictional contact with the shafts $k'$, so that while they maintain the shafts in their proper positions, they do not oppose their rotation by frictional resistance. The number of the rings $m$ will depend upon the number of shafts $k'$.

In Fig. 9 I show three shafts and three rings; and in Fig. 10 I show four shafts and a corresponding number of rings.

It will be seen that in each construction two connected bearing rings are employed, the rings $e\ e$ shown in Fig. 1 being connected by the base $f'$ formed with the housings $f\ f$, while in Fig. 8 the bearings $j'$ are connected by the cylindrical casing $j$. It will be seen, therefore, that various features of my invention are applicable both to apparatus in which the bearings surrounding the shaft are fixed, as in Fig. 1, and rotary, as in Fig. 8.

The construction shown in Fig. 1 may be used in an organization in which the containers $f'$ are adapted to rotate and are connected so as to form the ends of a casing, as in the construction shown in Fig. 8, in which case the pulley $b$ will be omitted, the loose rings $i$ serving to hold the shafts $c$ in their proper position, said rings $i$ being in this respect an equivalent of the independent rings $m$ shown in Figs. 8 and 9.

I claim—

1. A power transmitting apparatus comprising a shaft, connected containers surrounding the shaft and provided with internal annular bearings, a series of pairs of rolls interposed between the bearings and the shaft, shafts connecting the rolls, a pulley surrounding the driving-shaft, and a series of rolls connected with said pulley and bearing on the said roll-connecting shafts.

2. A power transmitting apparatus comprising a shaft, connected annular bearings surrounding the shaft, rolls interposed between said bearings and shaft, said rolls being movable endwise, and automatic means for reciprocating said rolls endwise to equalize the wear of the surfaces of the bearings, rolls, and shaft.

3. A power transmitting apparatus comprising a shaft having oppositely tapered sections, connected annular bearings surrounding said shaft, and rolls interposed between said bearings and shaft, said rolls being movable endwise and having portions of their peripheries tapered to co-operate, as described, with the tapered sections of the shaft in imparting initial endwise movements to the rolls, whereby the wear of the surfaces of the bearings, rolls, and shaft is equalized.

4. A power transmitting apparatus comprising a shaft, connected annular bearings surrounding the shaft, rolls interposed between the bearings and shaft, shafts connecting said rolls in pairs, and flexible connections between said rolls and their connecting shafts whereby the rolls are made self-adjusting, as set forth.

5. A power transmitting apparatus comprising a central shaft, two connected annular bearings surrounding the shaft, rolls interposed between the bearings and shaft, the rolls being connected by shafts extending parallel with the central shaft, and loose overlapping rings adapted to retain the shafts and rolls in their proper relative positions, each ring inclosing two shafts and co-operating with adjacent rings in forming bearings adapted to support the shafts laterally.

6. A contractible bearing ring transversely cut and provided with a compressible soft metal block between its ends, whereby the continuity of the ring is preserved.

In testimony whereof I have signed my name to this specification, in the presence of two subscribing witnesses, this 21st day of April, A. D. 1894.

GEORGE J. ALTHAM.

Witnesses:
C. F. BROWN,
A. D. HARRISON.